US011288438B2

United States Patent
Le et al.

(10) Patent No.: US 11,288,438 B2
(45) Date of Patent: Mar. 29, 2022

(54) BI-DIRECTIONAL SPATIAL-TEMPORAL REASONING FOR VIDEO-GROUNDED DIALOGUES

(71) Applicant: salesforce.com, inc., San Francisco, CA (US)

(72) Inventors: Hung Le, Singapore (SG); Chu Hong Hoi, Singapore (SG)

(73) Assignee: salesforce.com, inc., San Francisco, CA (US)

( * ) Notice: Subject to any disclaimer, the term of this patent is extended or adjusted under 35 U.S.C. 154(b) by 226 days.

(21) Appl. No.: 16/781,223

(22) Filed: Feb. 4, 2020

(65) Prior Publication Data

US 2021/0150118 A1  May 20, 2021

Related U.S. Application Data (60) Provisional application No. 62/968,423, filed on Jan. 31, 2020, provisional application No. 62/936,152, filed on Nov. 15, 2019.

(51) Int. Cl.
*G06K 9/62* (2006.01)
*G06F 40/10* (2020.01)
*G06N 3/08* (2006.01)
*G06F 40/284* (2020.01)
*G06K 9/00* (2022.01)

(52) U.S. Cl.
CPC ............ *G06F 40/10* (2020.01); *G06F 40/284* (2020.01); *G06K 9/00744* (2013.01); *G06N 3/08* (2013.01)

(58) Field of Classification Search
CPC ........ G06F 40/10; G06F 40/284; G06F 40/30; G06K 9/00744; G06K 9/6271; G06N 3/08; G06N 3/0445; G06N 3/0454; G06N 3/0481; G06N 3/084
USPC .......................................... 382/156; 348/157
See application file for complete search history.

(56) References Cited

U.S. PATENT DOCUMENTS

| 10,282,663 | B2 | 5/2019 | Socher et al. |
| 10,346,721 | B2 | 7/2019 | Albright et al. |
| 10,474,709 | B2 | 11/2019 | Paulus |
| 10,521,465 | B2 | 12/2019 | Paulus |
| 10,542,270 | B2 | 1/2020 | Zhou et al. |
| 2015/0297949 | A1* | 10/2015 | Aman ............... G06T 7/246 348/157 |

(Continued)

*Primary Examiner* — Charlotte M Baker
(74) *Attorney, Agent, or Firm* — Haynes and Boone, LLP (57) ABSTRACT

Systems and methods are provided for performing a video-grounded dialogue task by a neural network model using bi-directional spatial-temporal reasoning. According to some embodiments, the systems and methods implement a dual network architecture or framework. This framework includes one network or reasoning module that learns dependencies between text and video in the direction of spatial→temporal, and another network or reasoning module that learns in the direction of temporal→spatial. The output of the multimodal reasoning modules may be combined to learn dependencies between language features in dialogues. The result joint representation is used as a contextual feature to the decoding components which allow the model to semantically generate meaningful responses to the users. In some embodiments, pointer networks are extended to the video-grounded dialogue task to allow the model to point to specific tokens from multiple source sequences to generate responses.

20 Claims, 9 Drawing Sheets

(56) References Cited

U.S. PATENT DOCUMENTS

| | | |
|---|---|---|
| 2016/0350653 A1 | 12/2016 | Socher et al. |
| 2017/0024645 A1 | 1/2017 | Socher et al. |
| 2017/0032280 A1 | 2/2017 | Socher |
| 2017/0140240 A1 | 5/2017 | Socher |
| 2018/0082171 A1 | 3/2018 | Merity et al. |
| 2018/0096219 A1 | 4/2018 | Socher |
| 2018/0121787 A1 | 5/2018 | Hashimoto et al. |
| 2018/0121788 A1 | 5/2018 | Hashimoto et al. |
| 2018/0121799 A1 | 5/2018 | Hashimoto et al. |
| 2018/0129931 A1 | 5/2018 | Bradbury et al. |
| 2018/0129937 A1 | 5/2018 | Bradbury et al. |
| 2018/0129938 A1 | 5/2018 | Xiong et al. |
| 2018/0143966 A1 | 5/2018 | Lu et al. |
| 2018/0144208 A1 | 5/2018 | Lu et al. |
| 2018/0144248 A1 | 5/2018 | Lu et al. |
| 2018/0268287 A1 | 9/2018 | Johansen et al. |
| 2018/0268298 A1 | 9/2018 | Johansen et al. |
| 2018/0300317 A1 | 10/2018 | Bradbury |
| 2018/0336198 A1 | 11/2018 | Zhong et al. |
| 2018/0336453 A1 | 11/2018 | Merity et al. |
| 2018/0349359 A1 | 12/2018 | McCann et al. |
| 2018/0373682 A1 | 12/2018 | McCann et al. |
| 2018/0373987 A1 | 12/2018 | Zhang et al. |
| 2019/0130206 A1 | 5/2019 | Trott et al. |
| 2019/0130248 A1 | 5/2019 | Zhong et al. |
| 2019/0130249 A1 | 5/2019 | Bradbury et al. |
| 2019/0130273 A1 | 5/2019 | Keskar et al. |
| 2019/0130312 A1 | 5/2019 | Xiong et al. |
| 2019/0130896 A1 | 5/2019 | Zhou et al. |
| 2019/0130897 A1 | 5/2019 | Zhou et al. |
| 2019/0188568 A1 | 6/2019 | Keskar et al. |
| 2019/0213482 A1 | 7/2019 | Socher et al. |
| 2019/0251168 A1 | 8/2019 | McCann et al. |
| 2019/0251431 A1 | 8/2019 | Keskar et al. |
| 2019/0258714 A1 | 8/2019 | Zhong et al. |
| 2019/0258939 A1 | 8/2019 | Min et al. |
| 2019/0286073 A1 | 9/2019 | Hosseini-Asl et al. |
| 2019/0295530 A1 | 9/2019 | Hosseini-Asl et al. |
| 2019/0362020 A1 | 11/2019 | Paulus et al. |
| 2020/0005765 A1 | 1/2020 | Zhou et al. |
| 2021/0097644 A1* | 4/2021 | Sommerlade ............ G06T 3/20 |

\* cited by examiner

|       | #         | Train     | Val.    | Test    |
|-------|-----------|-----------|---------|---------|
| AVSD  | Dialogs   | 7,659     | 1,787   | 1,710   |
|       | Turns     | 153,180   | 35,740  | 13,490  |
|       | Words     | 1,450,754 | 339,006 | 110,252 |
| TGIFQA| Count QA  | 24,159    | 2,684   | 3,554   |
|       | Action QA | 18,428    | 2,047   | 2,274   |
|       | Trans. QA | 47,434    | 5,270   | 6,232   |
|       | Frame QA  | 35,453    | 3,939   | 13,691  |

*FIG. 7*

| Model | $Z_{vis}$ | $Z_{aud}$ | $Z_{cap}$ | BLEU1 | BLEU2 | BLEU3 | BLEU4 | METEOR | ROUGE-L | CIDEr |
|---|---|---|---|---|---|---|---|---|---|---|
| Baseline [ ] | I3D | - | - | 0.621 | 0.480 | 0.379 | 0.305 | 0.217 | 0.481 | 0.733 |
| MTN [ ] | I3D | - | - | 0.654 | 0.521 | 0.420 | 0.343 | 0.247 | 0.520 | 0.936 |
| MTN [ ] | ResNext | - | - | 0.688 | 0.550 | 0.444 | 0.363 | 0.260 | 0.541 | 0.985 |
| BiST | ResNext | - | - | 0.711 | 0.578 | 0.475 | 0.394 | 0.261 | 0.550 | 1.050 |
| AVSD Winner [ ] | ResNext | - | ✓ | 0.718 | 0.584 | 0.478 | 0.394 | 0.267 | 0.563 | 1.094 |
| MTN [ ] | I3D | - | ✓ | 0.715 | 0.581 | 0.476 | 0.392 | 0.269 | 0.559 | 1.066 |
| MTN [ ] | ResNext | - | ✓ | 0.731 | 0.597 | 0.490 | 0.406 | 0.271 | 0.564 | 1.127 |
| BiST | ResNext | - | ✓ | 0.754 | 0.622 | 0.515 | 0.430 | 0.284 | 0.584 | 1.190 |
| Baseline [ ] | I3D | VGGish | - | 0.626 | 0.485 | 0.383 | 0.309 | 0.215 | 0.487 | 0.746 |
| Student-Teacher [ ] | I3D | VGGish | - | 0.675 | 0.543 | 0.446 | 0.371 | 0.248 | 0.527 | 0.966 |
| MTN [ ] | I3D | VGGish | - | 0.692 | 0.556 | 0.450 | 0.368 | 0.259 | 0.537 | 0.964 |
| MTN [ ] | ResNext | VGGish | - | 0.688 | 0.554 | 0.452 | 0.372 | 0.251 | 0.531 | 0.950 |
| BiST | ResNext | VGGish | - | 0.715 | 0.569 | 0.477 | 0.390 | 0.259 | 0.552 | 1.030 |
| Student-Teacher [ ] | I3D | VGGish | ✓ | 0.727 | 0.593 | 0.488 | 0.405 | 0.273 | 0.566 | 1.118 |
| MTN [ ] | I3D | VGGish | ✓ | 0.731 | 0.597 | 0.494 | 0.410 | 0.274 | 0.569 | 1.129 |
| MTN [ ] | ResNext | VGGish | ✓ | 0.735 | 0.600 | 0.498 | 0.413 | 0.275 | 0.571 | 1.137 |
| BiST | ResNext | VGGish | ✓ | 0.755 | 0.619 | 0.510 | 0.429 | 0.284 | 0.581 | 1.192 |

*FIG. 8*

| Model | $Z_{vis}$ | Count (Loss) | Action (Acc) | Trans. (Acc) | Frame (Acc) |
|---|---|---|---|---|---|
| VIS (aggr) [36] | R | 5.09 | 0.468 | 0.569 | 0.346 |
| VIS (avg) [36] | R | 4.80 | 0.488 | 0.348 | 0.350 |
| MCB (aggr) [12] | R | 5.17 | 0.589 | 0.243 | 0.257 |
| MCB (avg) [12] | R | 5.54 | 0.291 | 0.330 | 0.155 |
| Yu et al. [55] | R | 5.13 | 0.561 | 0.640 | 0.396 |
| ST-VQA (s) [23] | R+C | 4.28 | 0.573 | 0.637 | 0.455 |
| ST-VQA (t) [23] | R+C | 4.40 | 0.608 | 0.671 | 0.493 |
| ST-VQA (st) [23] | R+C | 4.56 | 0.570 | 0.596 | 0.478 |
| Co-Mem [14] | R+F | 4.10 | 0.682 | 0.743 | 0.515 |
| PSAC [31] | R | 4.27 | 0.704 | 0.769 | 0.515 |
| HME [10] | R+C | 4.02 | 0.739 | 0.778 | 0.538 |
| STA [15] | R | 4.25 | 0.723 | 0.790 | 0.566 |
| CRN+MAC [27] | R | 4.23 | 0.713 | 0.787 | 0.592 |
| BiST | R | 2.40 | 0.839 | 0.817 | 0.630 |
| BiST | RX | 2.19 | 0.847 | 0.819 | 0.648 |

FIG. 9

| t2s | s2t | $N$ | $h_{att}$ | B-4 | MR | RL | CD |
|---|---|---|---|---|---|---|---|
| ✓ | ✓ | 3-3 | 8 | 0.430 | 0.284 | 0.584 | 1.190 |
| ✓ |  | 3-3 | 8 | 0.422 | 0.281 | 0.581 | 1.183 |
|  | ✓ | 3-3 | 8 | 0.420 | 0.282 | 0.579 | 1.177 |
| t only |  | 3-3 | 8 | 0.419 | 0.278 | 0.573 | 1.156 |
| s only |  | 3-3 | 8 | 0.418 | 0.276 | 0.570 | 1.150 |
| ✓ | ✓ | 1-1 | 8 | 0.418 | 0.280 | 0.574 | 1.171 |
| ✓ | ✓ | 2-2 | 8 | 0.422 | 0.278 | 0.576 | 1.171 |
| ✓ | ✓ | 3-3 | 1 | 0.414 | 0.278 | 0.580 | 1.173 |
| ✓ | ✓ | 3-3 | 2 | 0.418 | 0.280 | 0.579 | 1.174 |
| ✓ | ✓ | 3-3 | 4 | 0.428 | 0.280 | 0.584 | 1.195 |

BI-DIRECTIONAL SPATIAL-TEMPORAL REASONING FOR VIDEO-GROUNDED DIALOGUES

RELATED APPLICATIONS

This application claims priority to U.S. Provisional Patent Application No. 62/936,152, filed Nov. 15, 2019, entitled "Bi-Directional Spatial-Temporal Reasoning for Video-Grounded Dialogues" and U.S. Provisional Patent Application No. 62/968,423, filed Jan. 31, 2020, entitled "Bi-Directional Spatial-Temporal Reasoning for Video-Grounded Dialogues" which are incorporated by reference herein in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to machine learning models and neural networks, and more specifically, to bi-directional spatial-temporal reasoning for video-grounded dialogues.

BACKGROUND

Artificial intelligence, implemented with neural networks and deep learning models, has demonstrated great promise as a technique for automatically analyzing real-world information with human-like accuracy. Video-grounded dialogue is one application or task to which neural networks may be applied. In a video-grounded dialogue task, a neural network model or agent engages in a natural language dialogue or "conversation" with a human user regarding one or more videos.

In the figures and appendix, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

Artificial intelligence, implemented with neural networks and deep learning models, has demonstrated great promise as a technique for automatically analyzing real-world information with human-like accuracy. In general, such neural network and deep learning models receive input information and make predictions based on the same. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make. Neural network models have been shown to outperform and/or have the potential to outperform other computing techniques in a number of applications.

Video-grounded dialogue is one application or task to which neural networks may be applied. In a video-grounded dialogue task, a neural network model or agent engages in a natural language dialogue or "conversation" with a human user regarding one or more videos. One goal of research in video-grounded dialogues is for neural network models or agents to converse with humans not only based on signals from natural language but also from other modalities such as sound and vision. Video-grounded dialogue tasks may be considered or viewed as an extension of video Question-Answering (QA) where the agent answers questions from humans over multiple turns of dialogue rather than single turn. This is a very complex task for machines as they need to possess not only strong language understanding to generate natural responses but also sophisticated reasoning of video information, including the related objects, their position and action, etc. Compared to image-based natural language processing (NLP) tasks, video-grounded dialogues are more challenging as the feature representation of a video involves both spatial and temporal information. A dialogue agent must reason on both dimensions and address the two major problems: "where to look" (spatial reasoning) and "when to look" (temporal reasoning) in the video.

Figure 6A:
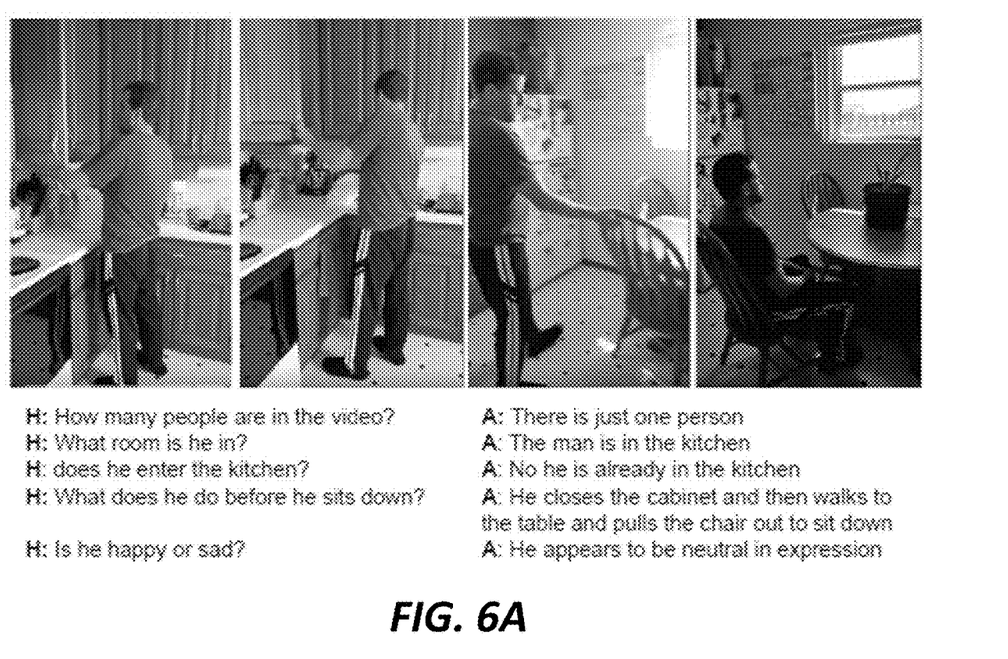
FIGS. 6A and 6B illustrate examples of video-grounded dialogue.
Figure 6B:
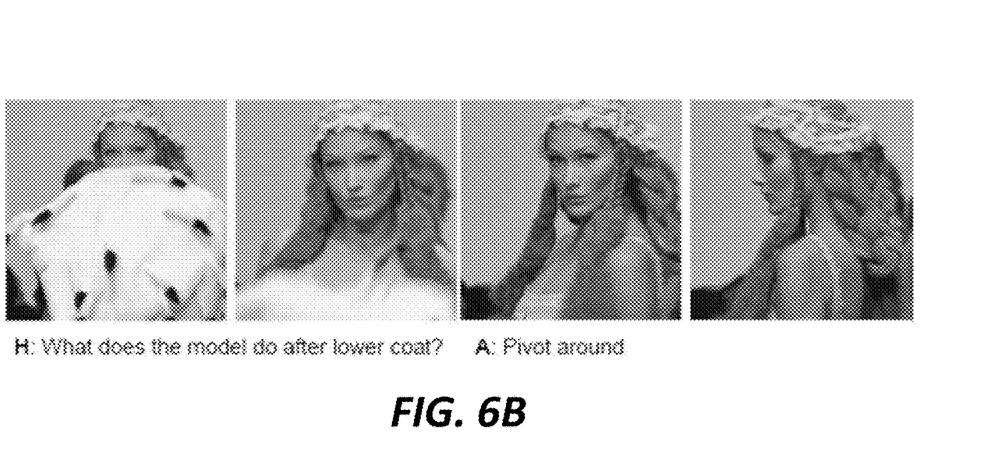

However, previously developed approaches for video-grounded dialogue focus on vision and language reasoning over temporal variance of input video and often neglect potential signals from the spatial dimension. That is, in most of real-life scenarios (such as the examples illustrated in FIGS. 6A and 6B), each video frame involves more than one object—such as human, furniture, clothes, etc. Usually, not all of the objects are relevant to the current dialogue context. Some previous approaches focus on single-direction reasoning by first learning signals of "where to look" and subsequently "when to look" (i.e., spatial→temporal). However, the majority of user utterances such as those in FIGS. 6A and 6B, could also be addressed by the reverse reasoning direction (i.e., temporal→spatial). In fact, in some user queries such as "does he enter the kitchen" (with reference to FIG. 6B) could be more conveniently addressed by first obtaining the relevant temporal signals (the beginning of the video) before focusing on spatial signals (man in the kitchen). Such drawback becomes more significant when the dialogue agent is required to reason over videos of extensive length and involving many objects.

The present disclosure provides systems and methods to improve vision and language reasoning modules in video-grounded dialogue tasks through bi-directional spatial-temporal reasoning. According to some embodiments, the systems and methods implement a dual network architecture or framework. This framework includes one network or reasoning module that learns dependencies between text and video in the direction of spatial→temporal, and another network or reasoning module that learns in the direction of temporal→spatial. The output of the multimodal reasoning modules is dynamically combined with a unimodal reasoning component which learns dependencies between language features in dialogues. The result joint representation is used as a contextual feature to the decoding components which allow the model or agent to semantically generate meaningful responses to the users. In some embodiments, pointer networks are extended to the video-grounded dialogue task to allow models to point to specific tokens from multiple source sequences to generate responses.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Computing Device

According to some embodiments, the systems of the present disclosure—including the various networks, models, and modules—can be implemented in one or more computing devices.

Figure 1:
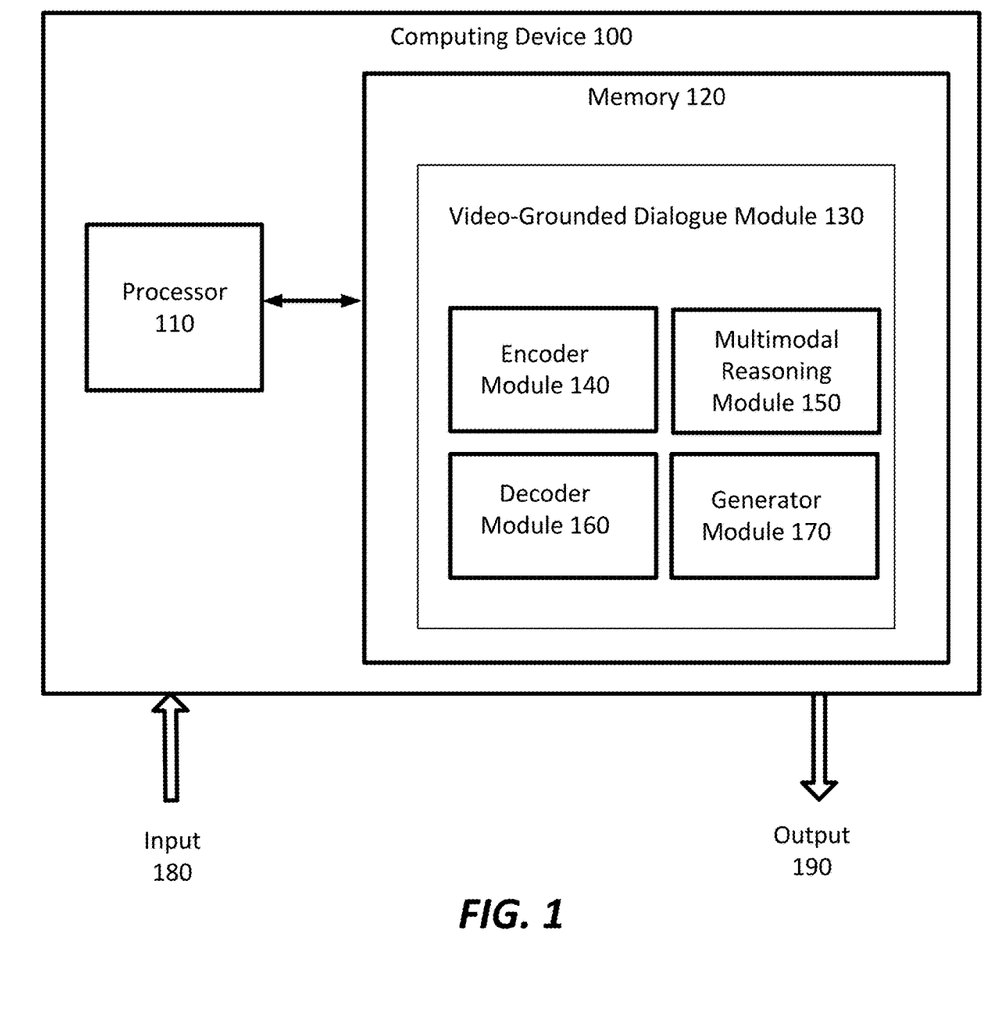
FIG. 1 is a simplified diagram of a computing device according to some embodiments.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a video-grounded dialogue module 130 that may be used to implement and/or emulate the neural network systems and models described further herein and/or to implement any of the methods described further herein. Video-grounded dialogue module 130 may be used, in some examples, for engaging in a natural language dialogue or "conversation" with a human user regarding one or more videos. In some embodiments, video-grounded dialogue module 130 may include an encoder module 140, a multimodal reasoning module 150, a decoder module 160, and a generator module 170.

In some examples, memory 120 may include non-transitory, tangible, machine readable media that includes executable code that when run by one or more processors (e.g., processor 110) may cause the one or more processors to perform the methods described in further detail herein. In some examples, video-grounded dialogue module 130, encoder module 140, multimodal reasoning module 150, decoder module 160, and/or generator module 170 may be implemented using hardware, software, and/or a combination of hardware and software. As shown, computing device 100 receives input 180, which is provided to video-grounded dialogue module 130. Video-grounded dialogue module 130 may generate output 190.

Bi-directional Spatial-Temporal (BiST) Framework or Model

According to some embodiments, systems and methods implement a framework or model for bi-directional spatial-temporal reasoning for video-grounded dialogues.

Figure 2:
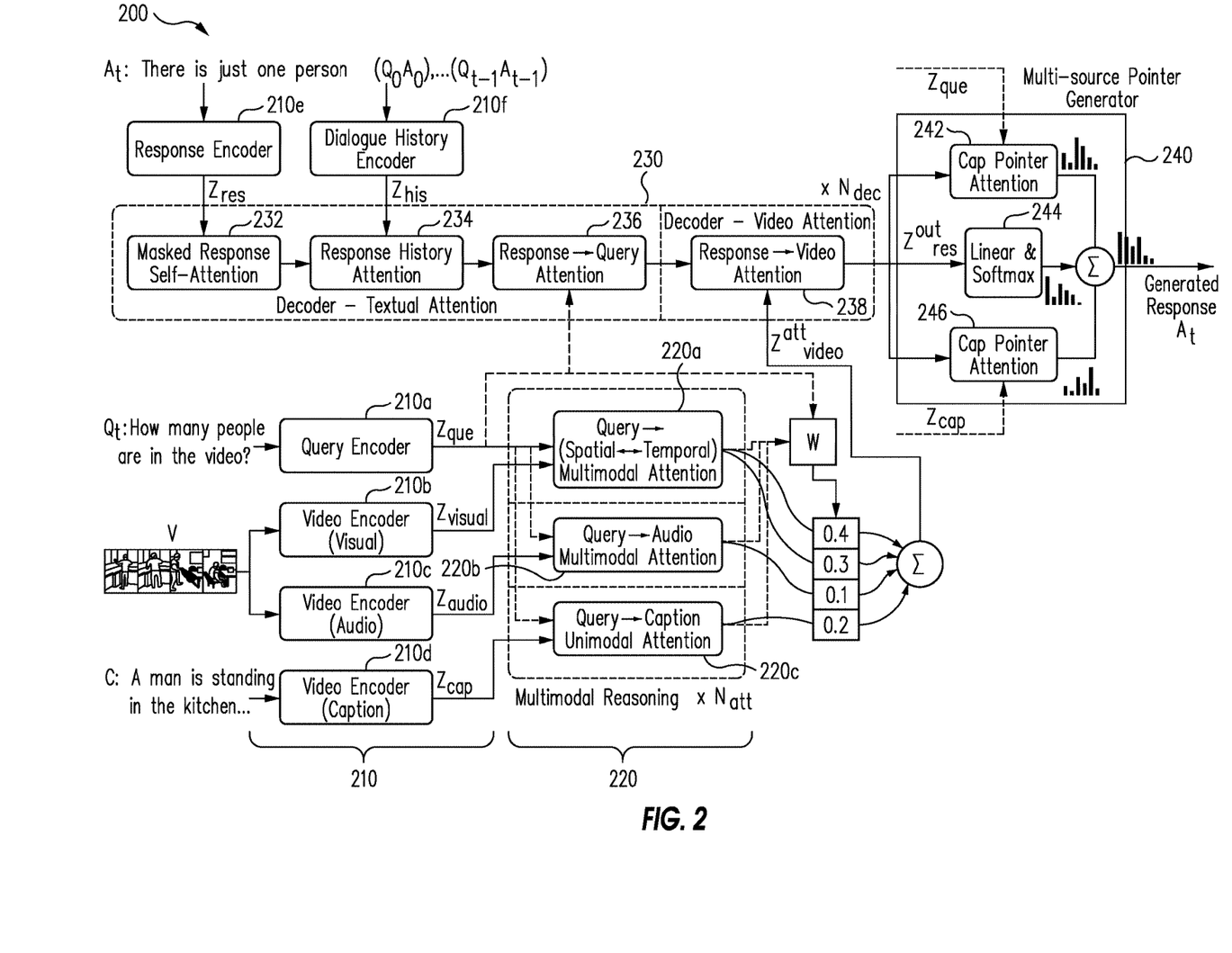
FIG. 2 is a simplified diagram of a model for video-grounded dialogue according to some embodiments.

FIG. 2 is a simplified diagram of a model 200 for video-grounded dialogue, according to some embodiments. In some embodiments, the model 200 may be implemented by video-grounded dialogue module 130 (FIG. 1). The model 200 receives input and generates output. In some embodiments, the input (e.g., input 180) to model 200 may include a video V, dialogue history of (t−1) turns, each including a pair of (human utterance, dialogue agent response) ($H_1$, $A_1$, $H_{t-1}$, $A_{t-1}$), and current human utterance $H_t$. The output (e.g., output 190) of the model 200 can include a system response $A_t$ in natural language that can address current user utterance and create a coherent dialogue. The input video can contain features in different modalities, including vision, audio, and text (such as video caption or subtitle). Without loss of generalization, given current dialogue turn t, each text input can be denoted as a sequence of tokens, each represented by a unique token index from a vocabulary set V: dialogue history $X_{his}$, user utterance $X_{que}$, text input of video $X_{cap}$ (assuming available video caption), and output response Y.

As shown, the model 200 comprises encoders 210, multimodal reasoning module 220, decoder 230, and generator 240, which in some embodiments can be implemented by, respectively, encoder module 140, multimodal reasoning module 150, decoder module 160, and generator module 170 (FIG. 1). Encoders 210 encode text sequences and video features, including visual, audio, and text features, into continuous representation. Multimodal reasoning module 220 learns dependencies between user utterances/queries and video features of multiple modalities. Decoder 230 passes encoded system responses over multiple attention steps, each of which integrates information from dialogue context or video. Generator 240 receives output from the decoder 230 and computes three distributions over vocabulary set to generate tokens in an auto-regressive manner.

Encoders

Encoders 210 encode text sequences and video features, including visual, audio, and text features, into continuous representation. In some implementations, encoders 210 of model 200 include a query encoder 210a, a video encoder (visual) 210b, a video encoder (audio) 210c, a video encoder (caption) 210d, response encoder 210e, and dialogue history encoder 210f. In some embodiments, the encoders 210a-d may be implemented as one or more text encoders and video encoders.

Figure 3A:
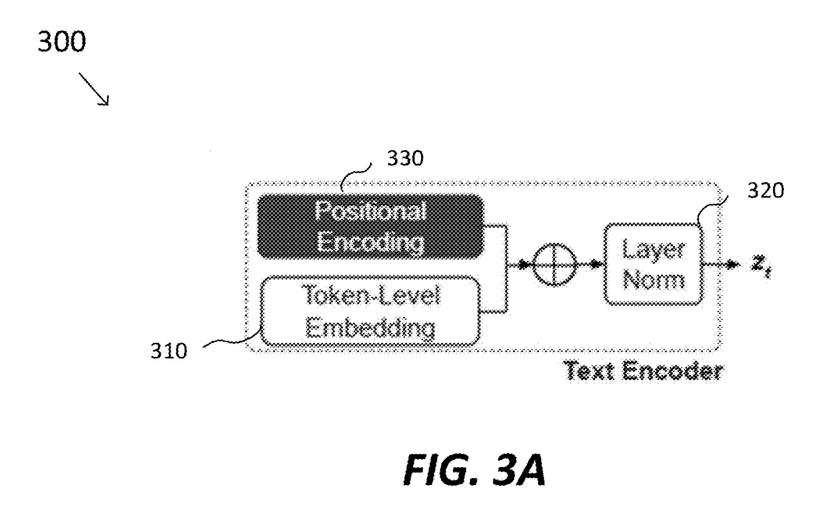
FIGS. 3A and 3B are a simplified diagram of encoders according to some embodiments.

Text encoder. In some embodiments, the text encoder is used to embed text-based input X into continuous representations $Z \in \mathbb{R}^{L_x \times d}$. $L_x$ is the length of sequence X and d is the embedding dimension. FIG. 3A shows an implementation for a text encoder 300, according to some embodiments. As illustrated, in some embodiments, text encoder 300 includes a token-level embedding layer 310 and a layer normalization 320. The embedding layer 310 may include a trainable matrix $E \in \mathbb{R}^{|V| \times d}$, with each row representing a token in the vocabulary set V as a vector of dimension d. E(X) is denoted as the embedding function that looks up the vector of each token in input text sequence X: $Z_{emb} = E(X) \in \mathbb{R}^{L_x \times d}$. Text encoder 300 may also include a positional encoding layer 330, which implements or performs positional encoding (PE). In some embodiments, to incorporate the positional encoding layer, the approach as described in Vaswani et al., "Attention is all you need," *Advances in Neural Information Processing Systems* 30, pages 5998-6008. Curran Associates, Inc. (2017) may be adopted, with each token position and dimension represented as a sine or cosine function. The output from positional encoding layer 330 and token-level embedding 310 is combined through element-wise summation and layer normalization 320.

$$Z = \text{LayerNorm}(Z_{emb} + \text{PE}(X)) \in \mathbb{R}^{L_x \times d} \quad (1)$$

In some embodiments, the output from text encoder 300 includes representations for dialogue history $Z_{his}$, user query $Z_{que}$, video caption $Z_{cap}$, and target response $Z_{res}$. For target response, during training, the sequence can be shifted left by one position to allow prediction in the decoding step i is auto-regressive on the previous positions 1, (i−1). The embedding matrix E is shared to encode all text sequences.

Figure 3B:
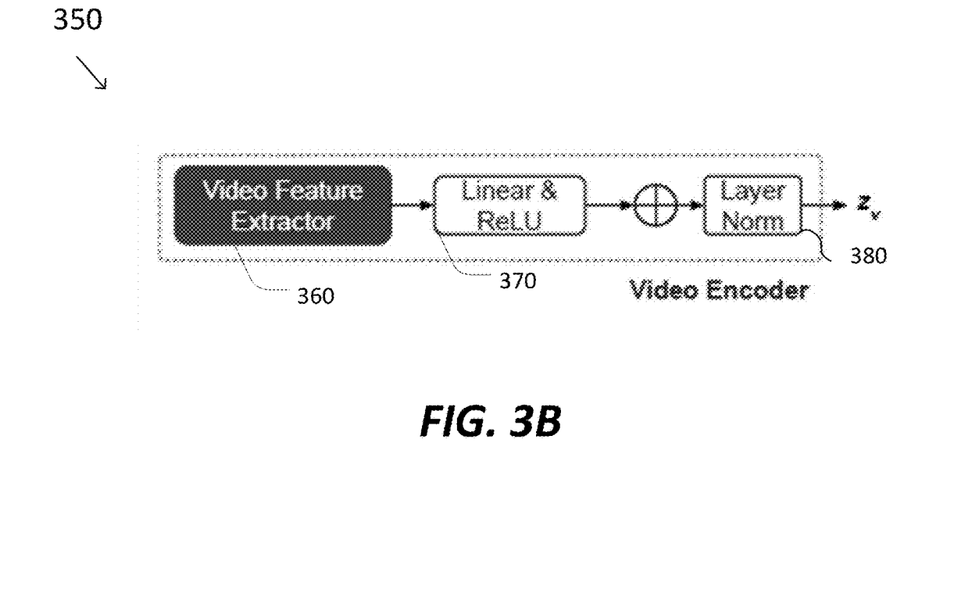

Video encoder. In some embodiments, the video encoder(s) can be implemented with one or more three-dimensional (3D) convolutional neural network (CNN) video models. FIG. 3B shows an implementation for a video encoder 350, according to some embodiments. As shown, the video encoder 350 may include a video feature extractor 360 which can extract one or more spatial-temporal visual features, where in some embodiments the dimensions of the resulting output depend on the configuration of sampling stride and clip length. The output from a pretrained visual model may be denoted as $Z_{vis}^{pre} \in \mathbb{R}^{F \times P \times d_{vis}^{pre}}$ where F is the number of sampled video clips, P is the spatial dimension from a 3D CNN layer, and $d_{vis}^{pre}$ is the feature dimension. The video encoder 350 may apply a linear layer with Rectified Linear Unit (ReLU) 370 and layer normalization 380 to reduce feature dimension to $d \ll d_{vis}^{pre}$.

$$Z_{vis} = \text{LayerNorm}(\text{ReLU}(Z_{vis}^{pre} W_{vis})) \in \mathbb{R}^{F \times P \times d} \quad (2)$$

where $W_{vis} \in \mathbb{R}^{d_{vis}^{pre} \times d}$. For audio features (of a video clip), the video encoder 350 may follow similar procedure to obtain audio representation $Z_{aud} \in \mathbb{R}^{F \times d}$. In some embodiments, the pretrained visual and audio models for the video encoders are kept fixed, and extracted features are directly used for dialogue models.

Bi-Directional Spatio-Temporal Reasoning (BiST)

Referring again to FIG. 2, model 200 includes multimodal reasoning module 220. In some embodiments, multimodal reasoning module 220 may implement multimodal reasoning module 150 (FIG. 1). Multimodal reasoning module 220 receives the output representations (e.g., representations for user query $Z_{que}$, visual $Z_{visual}$, audio $Z_{audio}$, and video caption $Z_{cap}$) from the video and text encoders 210a-d and learns dependencies between user utterances/queries and video features of multiple modalities.

According to some embodiments, the multimodal reasoning module 220 is implemented with a bidirectional architecture (e.g., query→(spatial↔temporal) multimodal attention module 220a), whereby the text features are used to select relevant information in both spatial and temporal dimensions in two reasoning directions.

Figure 4A:
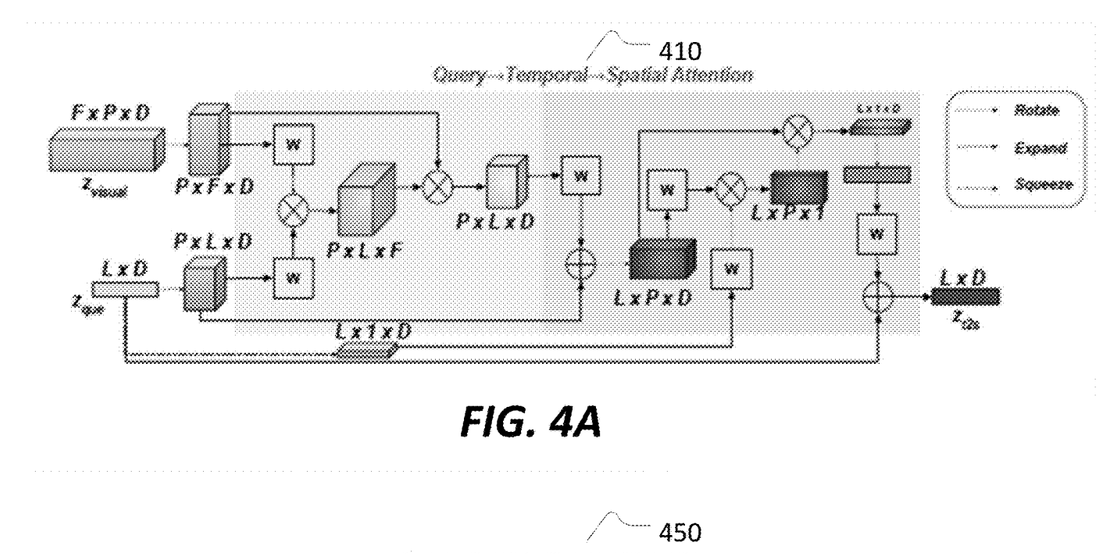
FIGS. 4A and 4B are a simplified diagram of multimodal reasoning modules according to some embodiments.
Figure 4B:
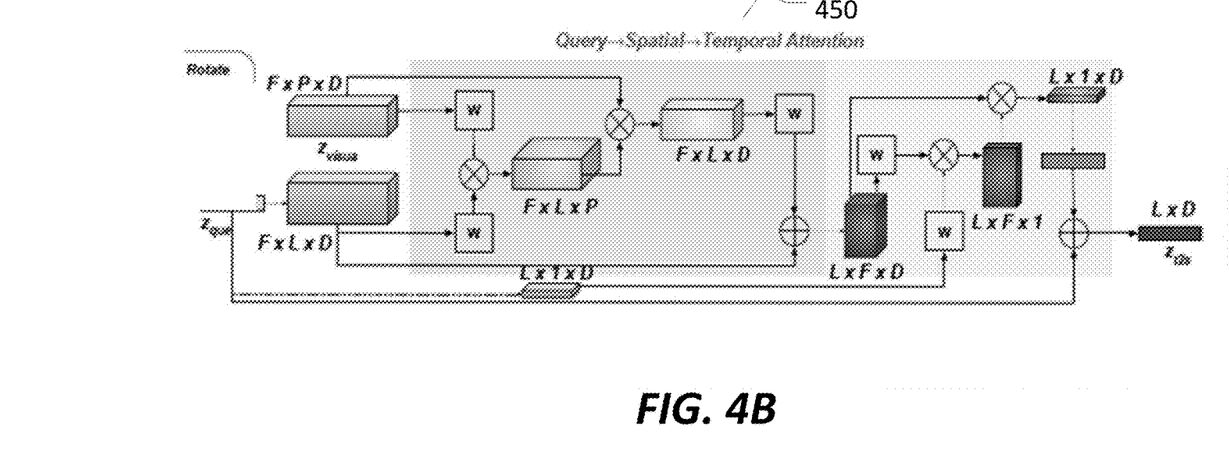

FIGS. 4A and 4B are a simplified diagram of multimodal reasoning module 400, according to some embodiments. As shown, multimodal reasoning module 400 includes bidirectional spatial-temporal reasoning modules 410 and 450. In some embodiments, bidirectional spatial-temporal reasoning modules 410 and 450 learn dependencies between text signals and visual signals in both spatial and temporal aspects. The dependencies are learned in two independent directions: spatial→temporal, and temporal→spatial. The outputs of the spatial-temporal reasoning modules 410 and 450 are dynamically combined. In some embodiments, each of reasoning modules 410 and 450 may include or be implemented with activation layers, including Softmax and ReLU (not shown).

In one reasoning direction, the user query $Z_{que}$ is used to select relevant information along temporal steps of each spatial region independently. Reasoning module 410 expands the encoded query features to P spatial positions. The expanded features are denoted as $X_{que}^{exp} \in \mathbb{R}^{P \times L_{que} \times d}$. For each spatial position, reasoning module 410 learns the dependencies along F temporal steps through dot-product attention.

$$Z_{t2s}^{(1)} = Z_{vis}^T W_{t2s}^{(1)} \in \mathbb{R}^{P \times F \times d_{att}} \quad (3)$$

$$Z_{t2s}^{(2)} = Z_{que}^{exp} W_{t2s}^{(2)} \in \mathbb{R}^{P \times L_{que} \times d_{att}} \quad (4)$$

$$S_{t2s}^{(1)} = \text{Softmax}(Z_{t2s}^{(2)} Z_{t2s}^{(1)T}) \in \mathbb{R}^{P \times L_{que} \times F} \quad (5)$$

where $W_{t2s}^{(1)} \in \mathbb{R}^{d \times d_{att}}$ and $W_{t2s}^{(2)} \in \mathbb{R}^{d \times d_{att}}$. The attention scores $S_{t2s}^{(1)}$ are used to obtain weighted sum along the temporal dimension of each spatial position. The result is passed through a linear transformation and ReLU layer. The output contains attended visual features and are combined with language features through skip connection and layer normalization.

$$Z_{t2s}^{(3)} = \text{ReLU}((S_{t2s}^{(1)} Z_{vis}^T) W_{t2s}^{(3)}) \in \mathbb{R}^{P \times L_{que} \times d} \quad (6)$$

$$Z_{t2s}^{(4)} = \text{LayerNorm}(Z_{que}^{exp} + Z_{t2s}^{(3)}) \in \mathbb{R}^{P \times L_{que} \times d} \quad (7)$$

where $W_{t2s}^{(3)} \in \mathbb{R}^{d_{att} \times d}$.

From the temporally attended features, user query $Z_{que}$ is used again to obtain dependencies along spatial dimension. In some embodiments, reasoning module 450 may use dot-product to model the interaction between each token in a query and each temporally attended spatial region. To make the query matrix compatible for the dot product, reasoning module 450 expands the query feature to three-dimensional tensor $Z_{que}^{exp} \in \mathbb{R}^{L_{que} \times 1 \times d}$.

$$Z_{t2s}^{(5)} = Z_{t2s}^{(4)} W_{t2s}^{(5)} \in \mathbb{R}^{L_{que} \times P \times d_{att}} \quad (8)$$

$$Z_{t2s}^{(6)} = Z_{que}^{exp} W_{t2s}^{(6)} \in \mathbb{R}^{L_{que} \times 1 \times d_{att}} \quad (9)$$

$$S_{t2s}^{(2)} = \text{Softmax}(Z_{t2s}^{(5)} Z_{t2s}^{(6)T}) \in \mathbb{R}^{L_{que} \times P \times 1} \quad (10)$$

where $W^{(5)} \in \mathbb{R}^{d \times d_{att}}$ and $W_{t2s}^{(6)} \in \mathbb{R}^{d \times d_{att}}$. The attention scores $S_{t2s}^{(2)}$ are used to obtain the weighted sum of all spatial positions. The output is temporally-to-spatially attended visual features and is again incorporated into language features.

$$Z_{t2s}^{(7)} = \text{ReLU}((S_{t2s}^{(2)T} Z_{t2s}^{(4)T}) W_{t2s}^{(7)}) \in \mathbb{R}^{L_{que} \times 1 \times d} \quad (11)$$

$$Z_{t2s}^{(8)} = \text{LayerNorm}(Z_{que} + Z_{t1s}^{(7)}) \in \mathbb{R}^{L_{que} \times d} \quad (12)$$

Although the above can obtain important video information, for a user query that is related to a specific object or video that involves many objects in each video frame, it can be more convenient to allow the model(s) of the present disclosure to focus on spatial dimension first. Similar procedure as Equation 3 to 7 is used to compute spatially attended features $Z_{s2t}^{(4)} \in \mathbb{R}^{F \times L_{que} \times d}$ followed by temporally attended features $Z_{s2t}^{(8)} \in \mathbb{R}^{L_{que} \times d}$. Refer to FIG. 4B for illustration.

In FIGS. 4A and 4B, the activation layers, including Softmax and ReLU, are not shown, and subscript and superscript of matrices W are omitted.

The two-way reasoning approach on visual features—Bi-directional Spatio-Temporal Reasoning (BiST)—allows the models to diffuse information in two different ways. BiST learns the dynamics between global (temporal) and local (spatial) variation in video scenes for more comprehensive feature learning. BiST focuses on text-to-vision reasoning rather than just interaction between visual signals (as with other approaches). Previous approaches in video-based natural language processing (NLP) tasks mostly exploit global representation of queries (e.g., long short-term memory (LSTM) hidden state of the last position) and temporal level representation of videos. This potentially loses critical information from individual tokens of user queries and local variation from spatial positions in video frames. The text-vision reasoning of the models of the present disclosure fully exploits token-level feature of user queries and both spatial and temporal-level features of videos to learn comprehensive dependencies. The output is denoted $Z_{s2t}^{att} = Z_{s2t}^{(8)}$ and $Z_{t2s}^{att} = Z_{t2s}^{(8)}$.

Multimodal Reasoning

Referring again to FIG. 2, in addition to bidirectional text-vision reasoning, in some embodiments, multimodal reasoning module 220 of model 200 can perform or include other reasoning modules for other modalities.

Text→Audio Reasoning. In some embodiments, a reasoning module (e.g., quer→y audio multimodal attention module 220b) captures dependencies between every token of a user query $Z_{que}$ and each temporal step of video audio $Z_{aud}$. The dependencies are learned through attention mechanism between two-dimensional vectors. For simplicity, Attend $(Z_1, Z_2)$ is denoted as an attention block between two-dimensional tensors $Z_1$ and $Z_2$.

$$Z^{(1)} = Z_1 W^{(1)} \in \mathbb{R} \; \mathbb{R} \quad (13)$$

$$Z^{(2)} = Z_2 W^{(2)} \in \mathbb{R} \; \mathbb{R} \quad (14)$$

$$S = \text{Softmax}(Z^{(2)} Z_{(1)}) \in \mathbb{R} \; \mathbb{R} \quad (15)$$

$$Z^{(a)} = \text{ReLU}((SZ_1) W^{(3)}) \in \mathbb{R} \; \mathbb{R} \quad (16)$$

$$Z^{(4)} = \text{LayerNorm}(Z_2 + Z^{(3)}) \in \mathbb{R} \; \mathbb{R} \quad (17)$$

where $W^{(1)}$, $W^{(2)}$, $W^{(3)}$ each has dimensions $\mathbb{R}^{d \times d_{att}}$. The output of text-audio reasoning is then defined as $Z_{aud}^{att} = \text{Attend}(Z_{aud}, Z_{que}) \in \mathbb{R}^{L_{que} \times d}$. $Z_{aud}^{att}$ contains query-guided temporally attended features from $Z_{aud}$.

Text→Text Reasoning. This reasoning module (e.g., query→caption unimodal attention module 220c) focuses on the unimodal dependencies between user query $Z_{que}$ and video caption $Z_{cap}$. As the caption contains useful (high-level) information about the video content V, in some embodiments, the dot-product attention mechanism is applied to obtain $Z_{cap}^{att} = \text{Attend}(Z_{cap}, Z_{que}) \in \mathbb{R}^{L_{que} \times d}$.

Progressive Reasoning. In some embodiments, the model capability can be further improved by performing multiple reasoning steps. For text→vision reasoning, the output $Z_{s2t}^{att}$ and $Z_{t2s}^{att}$ after a reasoning step is used to replace $Z_{que}$ (Equation 4, 7, 9, 12) in the next step. Similarly, each output $Z_{cap}^{att}$ and $Z_{aud}^{att}$ is used to replace $Z_{que}$ in the next Attend operation. In some embodiments, an equal number of reasoning steps $N_{att}$ may be adopted in each module.

Multimodal Fusioning. Given the attended features, they may be combined to obtain query-guided video representation, incorporating information from all modalities. We denote the concatenated representation $Z_{att} = \text{Concat}(Z_{t2s}^{att}, Z_{s2t}^{att}, Z_{aud}^{att}, Z_{cap}^{att}) \in \mathbb{R}^{L_{que} \times 4d}$.

$$Z_{que+att} = \text{Concat}(Z_{que}, Z_{att}) \in \mathbb{R}^{L_{que} \times 5d} \quad (18)$$

$$S_{vid} = \text{Softmax}(Z_{que+att} W_{vid}) \in \mathbb{R}^{L_{que} \times 4} \quad (19)$$

$$Z_{vid} = Z_{att} S_{vid} \in \mathbb{R}^{L_{que} \times d} \quad (20)$$

where $W_{vid} \in \mathbb{R}^{5d \times 4}$. $Z_{vid}$ includes comprehensive video signals integrated from different feature dimensions and reasoning directions.

Decoder

Decoder 230 passes encoded system responses (e.g., from response encoder 210e and dialogue history encoder 2100 over multiple attention steps or modules, each of which integrates information from dialogue context or video. In so doing, the decoder 230 incorporates different types of information.

Textual Attention. In some embodiments, the target response representations are first passed along three attention blocks that aim to learn semantics of text input. The first attention block (e.g., masked response self-attention block 232) can be implemented as a self-attention block to learn dependencies among the current response tokens $Z_{res}$ (e.g., output from response encoder 210e). Intuitively, this helps to shape a more semantically structured response.

$$Z_{res}^{dec} = \text{Attend}(Z_{res}, Z_{res}) \in \mathbb{R}^{L_{res} \times s} \quad (21)$$

The second and third attention blocks (e.g., response→history attention block 234 and response→query attention block 236) may be used to capture background information from dialogue history $Z_{his}$ and current user query $Z_{que}$ to make the responses output from the video-grounded dialogue system or model coherently connected to the whole dialogue context. The contextual dependencies are learned separately as the information in user query is more related than past dialogue turns.

$$Z_{his}^{dec} = \text{Attend}(Z_{his}, Z_{res}^{dec}) \in \mathbb{R}^{L_{res} \times d} \quad (22)$$

$$Z_{que}^{dec} = \text{Attend}(Z_{que}, Z_{his}^{dec}) \in \mathbb{R}^{L_{res} \times d} \quad (23)$$

Video Attention. In some embodiments, the output from multimodal reasoning module 220 is passed to an attention block (e.g., response→video attention block 238) so that query-guided video-dependent information is incorporated into current response representations. The decoding framework of the present disclosure is analogous to the thinking process in which humans naturally first shape a structured sentence (textual attention) and then insert factual information (video attention).

$$Z_{vid}^{dec} = \text{Attend}(Z_{vid}, Z_{que}^{dec}) \in \mathbb{R}^{L_{res} \times d} \quad (24)$$

Similar to the reasoning modules as described above, in some embodiments, the framework or model incorporates information from text and video over multiple rounds of attention by replacing each output $Z_{vid}^{dec}$ as $Z_{res}$ in Equation 21 in the next round. The number of attention rounds may be denoted as $N_{dec}$ and the final output as $Z_{dec}$.

Generator

Given the output from the decoder 230, the generator 240 is used to materialize or generate responses in natural language. In some embodiments, generator 240 receives output from the decoder 230 and computes three distributions over a vocabulary set to generate tokens in an autoregressive manner. In some embodiments, as shown, this is accomplished with one or more modules—e.g., pointer attention modules 242, 246, and linear & softmax module 244. Linear & softmax module 244 uses a linear transformation to obtain distribution over the vocabulary set V. $P_{out} = \text{Softmax}(Z_{vid}^{dec} W_{out}) \in \mathbb{R}^{L_{res} \times |V|}$ where $W_{out} \in \mathbb{R}^{d \times |V|}$. In some examples, generator 240 shares the weights between $W_{out}$ and E as the semantics between source sequences and target responses are similar. In addition, to strengthen the generation, pointer networks may be adopted to point to tokens in user queries $Z_{que}$ and video captions $Z_{cap}$ (e.g., pointer attention modules 242, 246). Ptr ($Z_1, Z_2$) denotes the pointer network operation—i.e. each token in $Z_2$ pointing to each position in $Z_1$ through attention mechanism Attend. In some embodiments, generator 240 sums the result probability distribution by each token to obtain Ptr($Z_1, Z_2$)$\in L_{Z_2} \times \|V\|$. The final probability distribution is the weighted sum of distributions $P_{out}$, Ptr($Z_{que}, Z_{dec}$), and Ptr($Z_{cap}, Z_{dec}$). The weights for this fusion may be defined as:

$$\alpha = \text{Softmax}(Z_{gen} W_{gen}) \in \mathbb{R}^{L_{res} \times 3} \quad (25)$$

$$Z_{gen} = \text{Concat}(Z_{res}, Z_{dec}, Z_{que}^{exp}, Z_{cap}^{exp}) \quad (26)$$

where $W_{gen} \in \mathbb{R}^{4d \times 3}$, and $Z_{que}^{exp}$ and $Z_{cap}^{exp}$ are expanded tensors of encoded caption and user queries to match output response dimensions. In some embodiments, all model parameters are optimized by jointly training to minimize the generation loss $\mathcal{L} = \Sigma_{i=0}^{L_Y} -\log(P(y_i))$.

Figure 5:
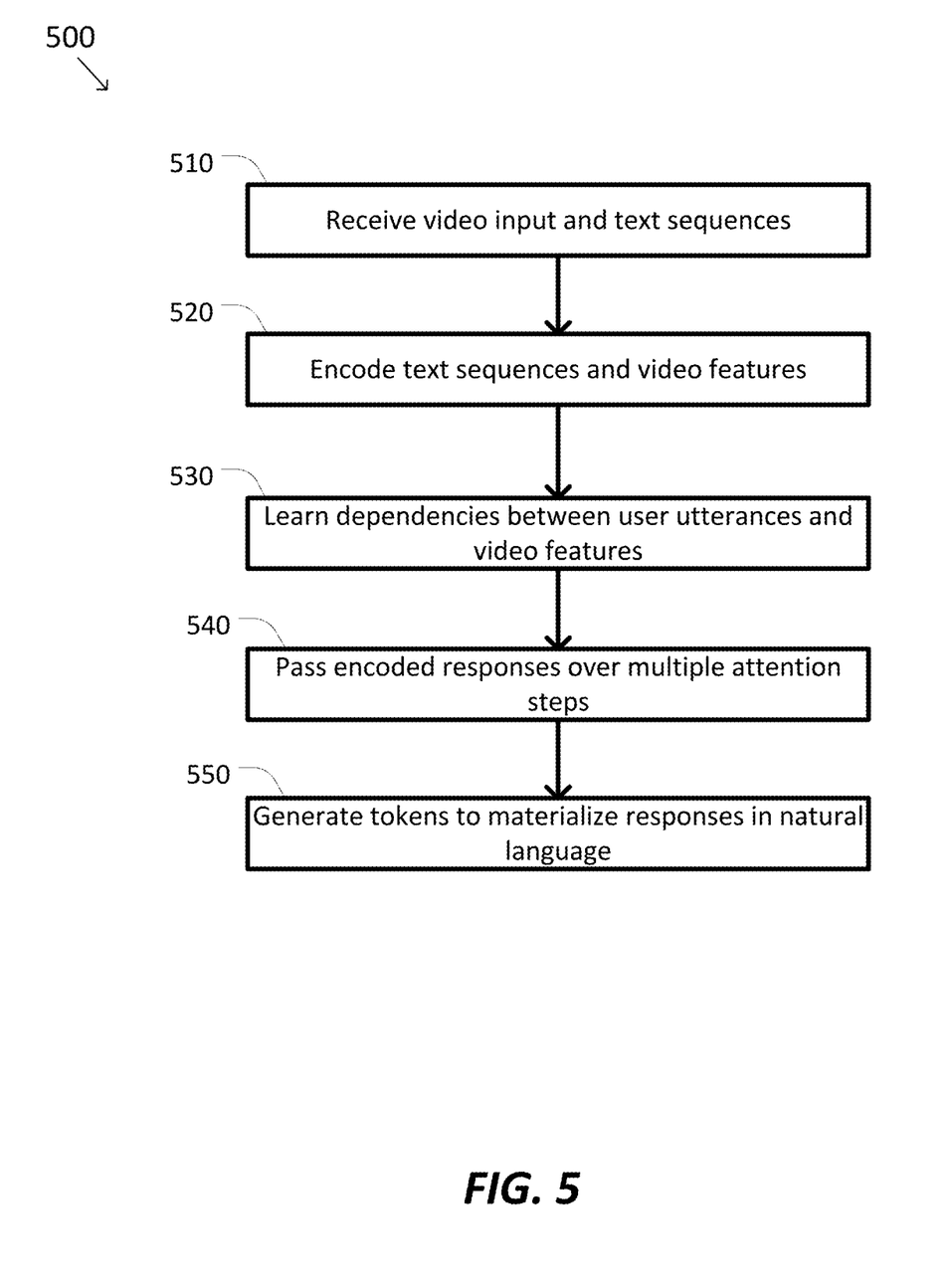
FIG. 5 is a simplified diagram of a method for video-grounded dialogue, according to some embodiments according to some embodiments.

FIG. 5 is a simplified diagram of a method 500 for video-grounded dialogue, according to some embodiments. One or more of the processes of method 500 may be implemented, at least in part, in the form of executable code stored on non-transitory, tangible, machine-readable media that when run by one or more processors may cause the one or more processors to perform one or more of the processes. In some embodiments, method 500 corresponds to the operation of video-grounded dialogue module 130 (FIG. 1) or model 200 (FIG. 2) to perform a video-grounded dialogue task.

Referring to FIGS. 1-5, at a process 510, the video-grounded dialogue model 200 receives video input V and text sequences. The text sequences can be part of a dialogue history between the model and a human user, such dialogue history including human utterance H and dialogue agent response A. The text sequences may also include a current human utterance for which the model should provide a response. At a process 520, encoder module 210 encodes the text sequences and video features. For this, in some embodiments, the encoder module 210 comprises a text encoder and a video encoder. At a process 530, the multimodal reasoning modules 220 learn dependencies between user utterances and video features. The dependencies are learned in two independent directions. Temporal-spatial reasoning module 310 learns dependencies in the direction of temporal→spatial. Spatial-temporal reasoning module 320 learns dependencies in the direction of spatial→temporal. The outputs of multimodal reasoning modules 310 and 320 are dynamically combined. At a process 540, the decoder module 230 passes encoded responses over multiple attention steps to incorporate relevant information for the dialogue agent to make a response to the human user. In some embodiments, this includes performing textual attention and video attention. At a process 550, the generator module 240 generates tokens to materialize responses in natural language. The responses may be output from model 200 as dialogue with the human user. Further details of the method 500 and its processes 510-550 are described herein with reference to the operations and functions of video-grounded dialogue module 130 (FIG. 1) or model 200 (FIG. 2).

Some examples of computing devices, such as computing device 100 may include non-transitory, tangible, machine readable media that include executable code that when run by one or more processors (e.g., processor 110) may cause the one or more processors to perform the processes of method 500. Some common forms of machine readable media that may include the processes of method 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Modification for Video Question-Answering (QA)

In some embodiments, the framework or model for video-grounded dialogues of the present disclosure can be adapted for the task of video question-answering (QA). In many video QA benchmarks, such as TGIF-QA, the tasks are retrieval-based (e.g., output a single score for each output candidate) rather than generation-based. With respect to modifying the framework or model of the present disclosure for video QA, in some embodiments, the input question is first concatenated with each candidate answer individually, and this is treated as $Z_{que}$ to the models. As there is no target response to be decoded, the models are adapted to this setting by using a trainable prior vector $Z_{prior} \in \mathbb{R}^d$ for each QA pair to replace $Z_{res}$ input to the decoder 230. The prior is used to accumulate information throughout the decoder. The output $Z_{vid}^{dec} \in \mathbb{R}^d$ is passed to a linear transformation layer to obtain a score $s_{out} = Z_{vid}^{dec} W_{out} \in \mathbb{R}$ where $W_{out} \in \mathbb{R}^{d \times 1}$ In this setting, the text→text and text→audio reasoning modules (e.g., query→audio multimodal attention module 220b and query→caption unimodal attention module 220c) can be removed. Furthermore, the response→history attention module 234 in the decoder 230 and pointer generator module (e.g., pointer attention modules 242, 246) can also be removed. The loss function is the summed pairwise hinge loss between scores of positive answer $s^p$ and each negative answer $s_i^n$. $\mathcal{L} = \Sigma_{i=0}^{K-1} \max(0, m-(s^p-s_i^n))$ where K is the total number of candidate answers and m is a hyper-parameter used as a margin between positive and negative answers.

Datasets

Figure 7:
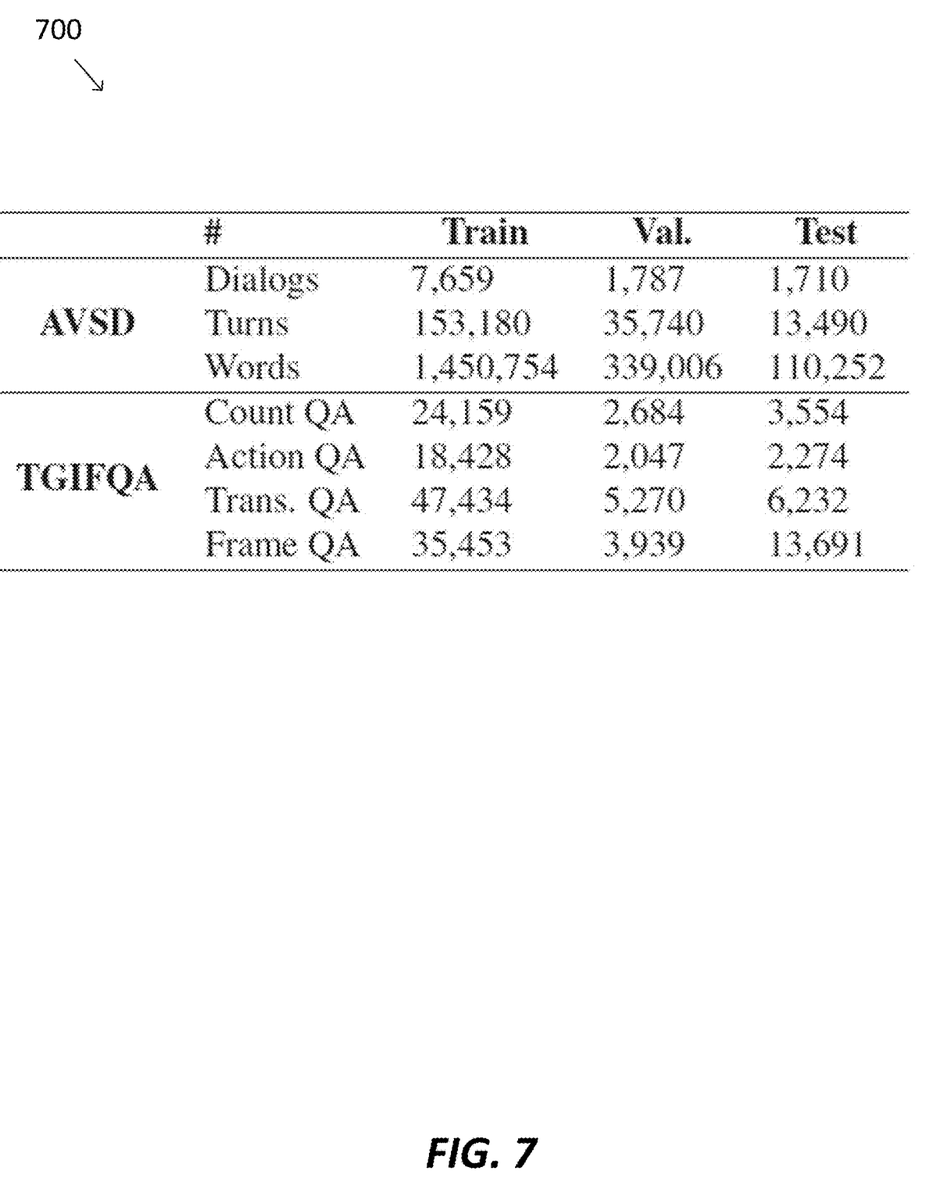
FIG. 7 shows a table summarizing benchmark datasets on which experiments can be conducted or performed.

Training and/or experiments for the systems and methods to improve vision and language reasoning modules in video-grounded dialogue tasks through the bi-directional spatial-temporal reasoning, according to some embodiments, can be conducted or performed using various datasets. FIG. 7 shows a table 700 summarizing example benchmark datasets, including AVSD and TGIF-QA. The AVSD benchmark from DSTC7 contains dialogues grounded on the Charades videos. The TGIF-QA contains 4 different tasks: (1) Count: open-ended task which counts the number of repetitions of an action. (2) Action: multi-choice (MC) task which asks about a certain action occurring fixed number of times. (3) Transition: MC task which asks about temporal variation of video. (4) Frame: open-ended task which can be answered from one of video frames.

Training Procedure

According to some embodiments, for training, the Adam optimizer [25], as described in further detail in Kingma et al., "Adam: A method for stochastic optimization," In *International Conference on Learning Representations (ICLR)*, 2015, and the learning rate strategy [44] as described in further detail in Vaswani et al., "Attention is all you need," *Advances in Neural Information Processing Systems* 30, pages 5998-6008. Curran Associates, Inc., 2017, both of which are incorporated by reference herein, may be adopted. In some embodiments, the learning rate warm-up steps equivalent are set to 5 epochs and train models up to 50 epochs. In some embodiments, the training adopts the multi-head approach in Attend operation to strengthen learning of dependencies. In some embodiments, models are selected or evaluated based on the average loss per epoch in the validation set. In some embodiments, the training initializes all models with uniform distribution. During training, the auxiliary loss function on output of text-video reasoning modules from Le et al., "Multimodal transformer networks for end-to-end video-grounded dialogue systems," In *Proceedings of the 57th Annual Meeting of the Association for Computational Linguistics*, pages 5612-5623, Florence, Italy, July 2019. Association for Computational Linguistics, incorporated herein by reference, may be adopted. The model hyper-parameters can be selected as follows: $d=d_{att}=128$, $N_{att}=N_{dec}=3$, attention heads $h_{att}=8$. Other hyper-parameters can be tuned following grid-search over the validation set. In some examples, for AVSD, the models of the present disclosure are trained by applying label smoothing on the target system responses Y. The training may adopt beam search technique with beam size 5 and a length penalty of 1:0. In some examples, for TGIF-QA, MC tasks, including Action and Transition, are trained following the pairwise loss as described above with K=5 and m=1. Count task may be trained with similar approach but as a regression problem. The loss function is measured as mean square error between output $s_{out}$ and label y. In some embodiments, the open-ended Frame task is trained as a generation task with single-token output. The prior vector $z_{prior} \in \mathbb{R}^d$ can be used as input to the model decoder 230. The multi-source pointer generator 240 may include a single linear layer with $W_{out} \in \mathbb{R}^{d \times \|V_{ans}\|}$.

Results

Results on the systems and methods to improve vision and language reasoning modules in video-grounded dialogue tasks through the bi-directional spatial-temporal (BiST) reasoning may be compared against other methods or approaches. In some examples, these other approaches include Baseline, Student-Teacher, MTN, VIS, MCB, ST-VQA, Co-Mem, PSAC, HME, STA, and CRN+MAC.

Figure 8:
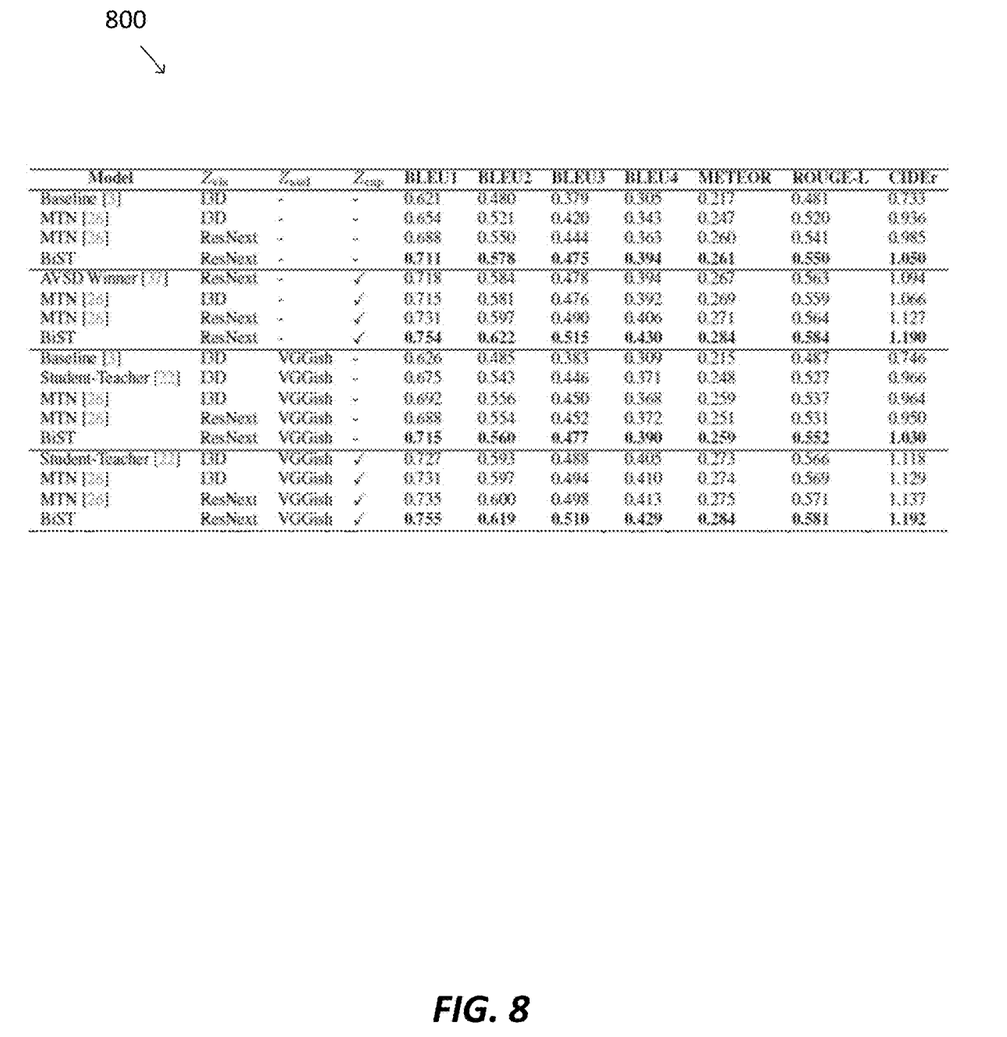
FIGS. 8 and 9 illustrate example results of video-grounded dialogue models of the present disclosure compared to other approaches, according to some embodiments.
Figure 9:
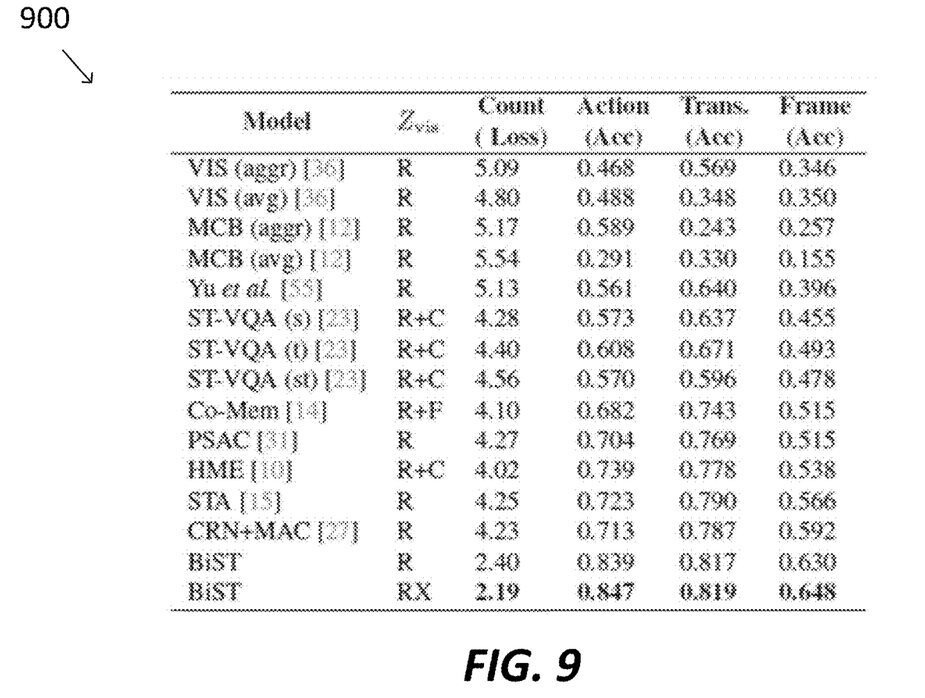

Tables 800 and 900 of FIGS. 8 and 9 show test results on the AVSD and TGIF-QA benchmarks datasets, respectively. In table 800, results are presented in four settings by video feature type: (1) visual-only (first section), visual and text (second section), visual and audio (third section), and visual, audio, and text (last section). In table 900, visual features are denoted as: R: ResNet, C: C3D, F: FlowCNN, and RX: ResNext. These tables 800 and 900 show that the framework and method of the present disclosure (labeled "BiST") outperforms other methods and approaches.

Figure 10:
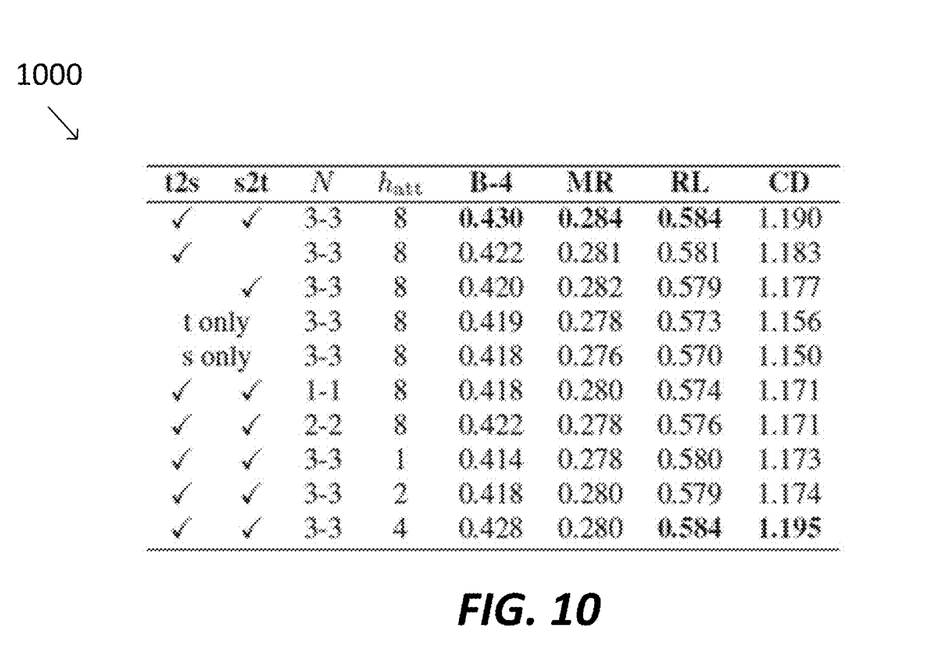
FIG. 10 illustrates example results of ablation analysis, according to some embodiments.

Table 1000 of FIG. 10 shows ablation analysis of the models of the present disclosure on the AVSD benchmark. Model variants are based on four factors: (1) spatial features (s), (2) temporal features (t) (either or both features with single or bidirectional reasoning), (3) $N=N_{att}=N_{dec}$, and (4) $h_{att}$. Metrics are denoted as: B-4: BLEU4, MR: METEOR, RL: ROUGE-L, CD: CIDEr.

From Table 1000, various observations can be made. First, in some examples, when using a single reasoning direction, the model with temporal→spatial performs better than one with spatial→temporal. One reason for this is that the videos in AVSD benchmark are longer and different video segments contain different objects and motions. In addition, user queries in dialogues typically concern different parts of the video separately over dialogue turns. Thus, it is convenient to first obtain relevant temporal steps before selecting related spatial positions. The performance improves when the models use both reasoning directions rather than only one of them. Second, it is observed that in some examples using both spatial and temporal features is better than only using one of them, demonstrating the importance of information in both dimensions. Third, the contribution of multi-step learning is noted in the text-video reasoning as the performance improves with larger reasoning steps. Finally, in some examples, using a multi-head attention mechanism is suitable for tasks dealing with information-intensive media such as video. The performance can improve significantly when, for example, attention heads in the models are increased from 1 to 4.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for performing a video-grounded dialogue task by a neural network model, the method comprising:
    receiving features for a video and text sequences, wherein the text sequences comprise a dialogue history between the model and a human user regarding the video and a current query by the human user;
    encoding the video features and text sequences into continuous representations;
    using the encoded continuous representations, learning dependencies between the text sequences and the video features in the direction of temporal to spatial;
    using the encoded continuous representations, learning dependencies between the text sequences and the video features in the direction of spatial to temporal; and
    using the learned dependencies in the direction of temporal to spatial and in the direction of spatial to temporal, generating a textual response in natural language for the current query.

2. The method of claim 1, comprising dynamically combining outputs of the learned dependencies to generate a joint query-aware contextual vector.

3. The method of claim 1, wherein generating a textual response comprises performing video attention and textual attention using the learned dependencies to incorporate relevant information for the model.

4. The method of claim 3, comprising generating one or more tokens to materialize the textual response in natural language.

5. The method of claim 4, wherein generating a textual response comprises performing a linear transformation to obtain a distribution over a vocabulary set.

6. The method of claim 1, comprising outputting the textual response in natural language to the human user in response to the current query.

7. The method of claim 1, wherein the video features comprise one or more of video data, audio data, and caption data related to at least one video.

8. The method of claim 1, wherein encoding the text sequences comprises performing token-level embedding.

9. The method of claim 1, wherein encoding the video features comprises extracting spatial-temporal visual features.

10. The method of claim 1, wherein learning dependencies comprises using the current query to select information along temporal steps of the video features.

11. A non-transitory machine-readable medium comprising executable code which when executed by one or more processors associated with a computer are adapted to cause the one or more processors to perform a method for performing a video-grounded dialogue task by a neural network model comprising:
    receiving features for a video and text sequences, wherein the text sequences comprise a dialogue history between the model and a human user regarding the video and a current query by the human user;
    encoding the video features and text sequences into continuous representations;
    using the encoded continuous representations, learning dependencies between the text sequences and the video features in the direction of temporal to spatial;
    using the encoded continuous representations, learning dependencies between the text sequences and the video features in the direction of spatial to temporal; and
    using the learned dependencies in the direction of temporal to spatial and in the direction of spatial to temporal, generating a textual response in natural language for the current query.

12. The non-transitory machine-readable medium of claim 11, comprising dynamically combining outputs of the learned dependencies to generate a joint query-aware contextual vector.

13. The non-transitory machine-readable medium of claim 11, wherein generating a textual response comprises performing video attention and textual attention using the learned dependencies to incorporate relevant information for the model.

14. The non-transitory machine-readable medium of claim 13, comprising generating one or more tokens to materialize the textual response in natural language.

15. The non-transitory machine-readable medium of claim 14, wherein generating a textual response comprises performing a linear transformation to obtain a distribution over a vocabulary set.

16. The non-transitory machine-readable medium of claim 11, comprising outputting the textual response in natural language to the human user in response to the current query.

17. The non-transitory machine-readable medium of claim 11, wherein the video features comprise one or more of video data, audio data, and caption data related to at least one video.

18. The non-transitory machine-readable medium of claim 11, wherein encoding the text sequences comprises performing token-level embedding.

19. The non-transitory machine-readable medium of claim 11, wherein encoding the video features comprises extracting spatial-temporal visual features.

20. The non-transitory machine-readable medium of claim 11, wherein learning dependencies comprises using the current query to select information along temporal steps of the video features.

* * * * *